No. 753,084. PATENTED FEB. 23, 1904.
A. LIPSCHUTZ.
BRAKE ROD JAW.
APPLICATION FILED NOV. 5, 1903.

NO MODEL.

Fig. 5.

Witnesses
W. H. Alexander
D. C. Betjeman

Inventor
A. Lipschutz
By Attorneys
Fowler & Bryson

No. 753,084. Patented February 23, 1904.

UNITED STATES PATENT OFFICE.

ARTHUR LIPSCHUTZ, OF ST. LOUIS, MISSOURI.

BRAKE-ROD JAW.

SPECIFICATION forming part of Letters Patent No. 753,084, dated February 23, 1904.

Application filed November 5, 1903. Serial No. 179,888. (No model.)

*To all whom it may concern:*

Be it known that I, ARTHUR LIPSCHUTZ, a citizen of the United States, residing at the city of St. Louis, in the State of Missouri, have invented a certain new and useful Improvement in Brake-Rod Jaws, of which the following is such a full, clear, and exact description as will enable any one skilled in the art to which it appertains to make and use the same, reference being had to the accompanying drawings, forming part of this specification.

My invention relates to brake-rod jaws—that is, jaws which can be secured to the forward end of the brake-rod and which are adapted to embrace the brake-beam and be pivoted thereto.

My invention relates more particularly to improvements in that form of brake-rod jaw shown in Patent No. 733,853, granted to me July 14, 1903.

The object of my invention is to provide means for preventing the loop of the brake-rod from spreading and at the same time to so construct the jaw that there will be a forward wall or partition to receive the forward thrust of the rod and also to so construct the jaw that the rod may be readily placed in position.

My invention consists in part in a brake-rod jaw adapted to embrace a brake-lever and to be pivoted thereto, said jaw being provided with a web adapted to be embraced by the loop of the brake-rod, an abutment forward of said web, and means for preventing the spreading of the loop of the rod.

My invention also consists in certain other novel features and details, all of which will be described in the following specification and pointed out in the claims affixed hereto.

Figure 1:
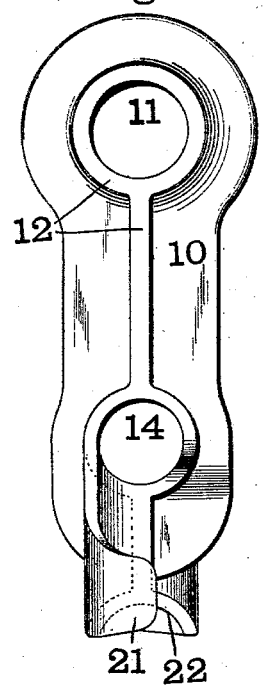
Figure 2:
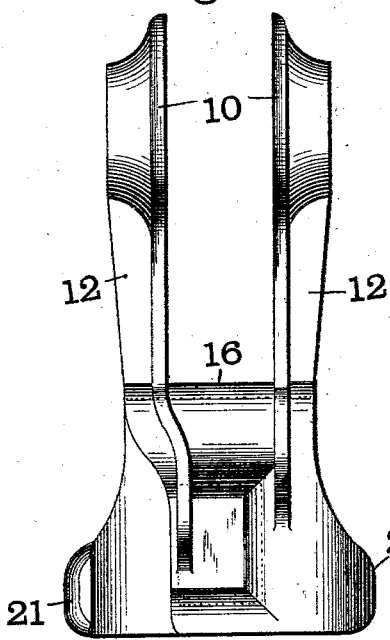
Figure 3:
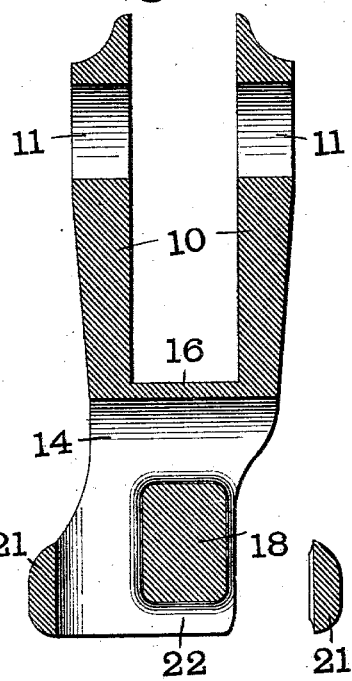
Figure 4:
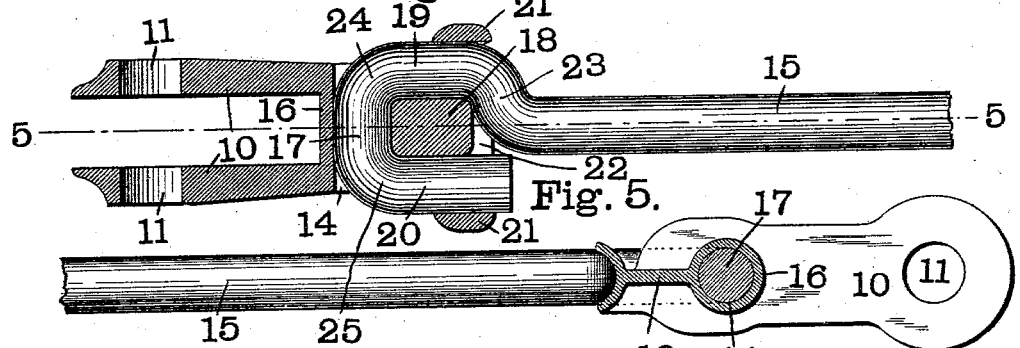
Figure 6:
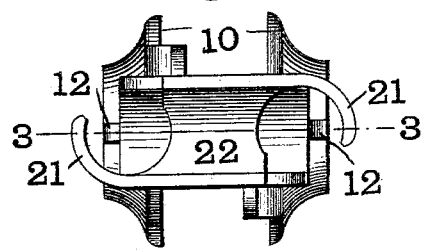

In the accompanying drawings, which illustrate one form of brake-rod jaw made in accordance with my invention, Figure 1 is a side elevation of the jaw. Fig. 2 is a top plan view. Fig. 3 is a section on the line 3 3 of Fig. 6. Fig. 4 is a view, on a reduced scale, similar to Fig. 3, but showing the end of the brake-rod in position. Fig. 5 is a section, also on a reduced scale, taken on the line 5 5 of Fig. 4; and Fig. 6 is a rear end view.

Like marks of reference refer to similar parts in the several views of the drawings.

The forward end of the jaw consists of two parallel arms or plates 10, which are adapted to embrace the brake-lever in the usual manner and to be pivoted thereto by means of a pin passing through openings 11 in the said arms. The arms 10 are preferably provided with strengthening-ribs 12. In the rear end of the jaw is formed a transverse opening 14, through which the end of the brake-rod 15 is adapted to pass, as will be hereinafter described. The front wall 16 of the opening 14 forms an abutment against which the forward end 17 of the loop in the rod 15 is adapted to bear when a thrust is imparted to the rod. The rear wall of the opening 14 forms a web 18, which is adapted to be embraced by the two sides 19 and 20, respectively, of the loop formed in the end of the rod 15.

21 represents two lugs, which are adapted to embrace the sides 19 and 20 of the loop, and thus prevent the said loop from spreading. These lugs 21 are reversely arranged, as best shown in Fig. 6, for a purpose which will be hereinafter described. The rear edge of the web 18 is preferably provided with a groove 22, so that the brake-rod 19 may be bent at 23, as shown in Fig. 4, in order to bring the center of the rod 15 in line with the center of the jaw, thus insuring a central pull on the rod. The other points at which the rod 15 is bent are indicated at 24 and 25.

In securing the brake-rod 15 in position in the jaw the said rod is first bent at 24, so as to leave the parts 17 and 20 substantially at right angles to the main portion of the rod. These parts can then be passed through the opening 14 and the side 19 moved down into the same plane, as shown in Fig. 4, but so as to miss the lug 21. The rod can then be swung with the forward end 17 of the loop as a pivot, so as to bring the side of the loop 19 between the lug 21 and the web 18. The part 20 can now be bent over, but should be so bent as to miss the lug 21. After it has been bent down into the plane shown in Fig. 4 it can then be bent laterally, so as to pass between the lug and the web. The rod will now be firmly secured in position, as it will be impossible to either move the rod forward or laterally or to spread the loop. If it is now desired to bring the rod into alinement with the center of the jaw, the bend 23 is formed, the object of the groove 22 being to facilitate this bending at 23.

It will be seen that while the loop of the rod is prevented from spreading, the rod at the same time is supported by the forward abutment 16 and is also firmly secured against lateral movement.

Having fully described my invention, what I claim as new, and desire to secure by Letters Patent of the United States, is—

1. A brake-rod jaw adapted to embrace a brake-lever and be pivoted thereto, said jaw having a web adapted to be embraced by the loop of a brake-rod, an abutment forward of said web, and means for preventing the spreading of the loop of the rod.

2. A brake-rod jaw adapted to embrace a brake-lever and be pivoted thereto, said jaw having an opening for the passage of a brake-rod, the front wall of said opening forming an abutment, and the rear wall a web adapted to be embraced by the loop of the brake-rod, and means for preventing the spreading of the loop.

3. A brake-rod jaw adapted to embrace a brake-lever and be pivoted thereto, said jaw having a web adapted to be embraced by the loop of a brake-rod, an abutment forward of said web, and a lug adjacent to said web, said lug being so arranged that the side of the loop may be swung laterally between said lug and web.

4. A brake-rod jaw adapted to embrace a brake-lever and be pivoted thereto, said jaw having a web adapted to be embraced by the loop of a brake-rod, an abutment forward of said web, and lugs carried by said jaw for engaging the sides of the loop of the brake-rod and preventing its spreading.

5. A brake-rod jaw adapted to embrace a brake-lever and be pivoted thereto, said jaw having a web adapted to be embraced by the loop of a brake-rod, an abutment forward of said web, and a pair of lugs reversely arranged at opposite sides of said web to prevent spreading of the loop.

In testimony whereof I have hereunto set my hand and affixed my seal in the presence of the two subscribing witnesses.

ARTHUR LIPSCHUTZ. [L. S.]

Witnesses:
 DAVID A. HORN,
 JAMES H. BRYSON.